Feb. 9, 1943.  J. A. WIDMER  2,310,503
DAMPING AND CUSHIONING ARRANGEMENT FOR MEASURING INSTRUMENTS
Filed July 17, 1941
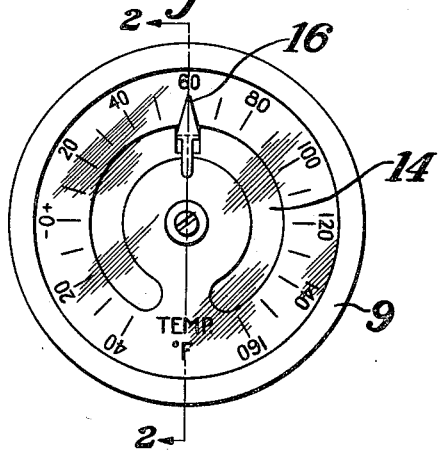
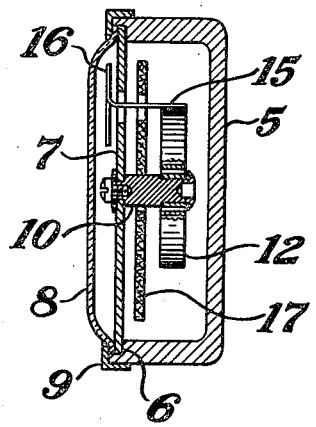
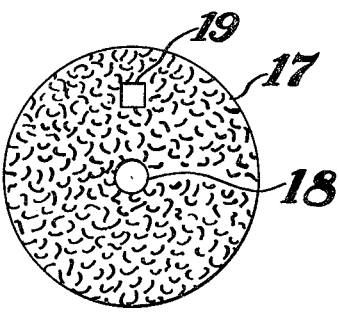
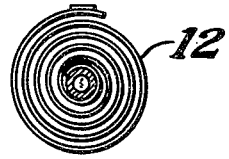
INVENTOR.
Jules A. Widmer
BY
D. Clyde Jones
ATTORNEY.

Patented Feb. 9, 1943

2,310,503

UNITED STATES PATENT OFFICE 2,310,503

DAMPING AND CUSHIONING ARRANGEMENT FOR MEASURING INSTRUMENTS

Jules A. Widmer, Rochester, N. Y., assignor to Taylor Instrument Companies, Rochester, N. Y., a corporation of New York Application July 17, 1941, Serial No. 402,782

3 Claims. (Cl. 73—367)

This invention relates to a condition indicating instrument such as a thermometer or the like.

Where a condition indicating instrument is mounted on a support which is subjected to vibration, the index of the instrument will flutter to such an extent that it is difficult to take a reading. This is particularly true of a bimetallic type of thermometer when mounted on a traveling vehicle, such as an automobile. In addition to this objectionable flutter, the instrument will clatter when its parts strike together as a result of sudden jolts.

The main feature of the present invention relates to a novel arrangement for damping the flutter of an instrument index and for preventing noise in an instrument that is subjected to shocks.

A further feature of the invention relates to an indicating instrument including a disc of cushioning material mounted for frictional rotation with the index of the instrument to prevent oscillation or fluttering of the index.

These features and advantages of the invention will appear from the detailed description and claims when taken with the drawing in which:

Fig. 1 is a front view of the instrument of the present invention;

Fig. 2 is a section through the instrument taken substantially on the line 2—2 of Fig. 1;

Fig. 3 is a plan view of a cushioning or damping element for use in the instrument; and Fig. 4 is a detailed view of the condition responsive strip and a portion of its mounting.

In the drawing, the instrument is illustrated as a thermometer adapted to be mounted on an automobile or on another support which is subjected to vibration. However, this invention is not limited to use in a thermometer but may be utilized in other types of measuring instruments where the mechanisms thereof are subjected to mechanical disturbances.

This thermometer includes a cup-shaped case 5 having a shoulder 6 at its rim to support a dial plate 7. This dial plate has a graduated scale on its front surface, the scale being arranged in the arc of a circle, the center of which is located at the center of the dial. A dished crystal 8 is superimposed over the dial, and has its margin clamped to the rim of the case by a clamping ring 9.

There is mounted within the case, a pillar 10 extending in a direction perpendicular to the plane of the dial, the axis of this pillar being in alinement with the center of the dial. This pillar is conveniently secured to the rear surface of the dial in the position just mentioned, although the invention is not limited to this mounting. There is secured to this pillar, one end of a condition sensing element which is herein illustrated as a bimetallic strip 12 wound into spiral form, the principal plane of this spiral being substantially parallel to the dial. As best shown in Fig. 1, the dial has therein, an arcuate opening 14 concentrically located with respect to the graduated scale. This arcuate opening in the dial receives an index extension 15, having one end secured to the free end of this spiral strip 12. The other end of this extension carries an index 16 adapted to sweep over the graduated scale in accordance with the responses of the spiral strip 12, to changing temperatures.

If a thermometer of this type is mounted on a vibrating support such as a moving automobile, these vibrations will cause the index to flutter so that it will be difficult to make a satisfactory reading. Furthermore, if the thermometer is subjected to severe jolts, the parts of the mechanism within the thermometer case will strike against each other causing an objectionable clatter. In accordance with the present invention, means are provided for overcoming these two objectionable features. As herein shown, this means comprises a disc 17 of felt or other suitable cushioning material as illustrated in Fig. 3. This disc, which is slightly smaller than the dial, has a center opening 18 therein through which the pillar 10 passes in the course of the assembly of the instrument so that the cushioning disc is located between the dial and the spiral strip 12. It should be mentioned that the diameter of the center opening in the disc is larger than the diameter of the pillar 10 by an amount which may be as great as one-sixteenth of an inch. Since the instrument is normally supported in a vertical position as illustrated, the disc rests on and frictionally engages the upper side of the pillar for rotation thereon. The disc also has an opening 19 near its margin through which there passes the extension 15 mounted on the free end of the spiral strip 12. The width of the opening 19 in the disc is approximately that of the width of the extension 15, as best shown in Fig. 1, so that the extension normally engages the edges of the disc at this opening. Since the cushioning disc is positioned between the spiral strip 12 and the dial, there will be no possibility for any part of the strip to strike against the dial and consequently noise from this source will be prevented. Also, any slight vibrations due to jarring of the support of the thermometer will be damped out since the edges of the extension on the free end of the spring will engage the edge of the material at the opening 19 in the damping disc. It will be remembered that this disc is frictionally rotatable on the pillar 10 so that the resistance of the disc to rotation will be sufficient to prevent flutter of the index 16 carried by the extension. However, when this spiral strip 12 responds to a change in the temperature condition, the force of the strip applied to the extension will be sufficient to overcome the friction between the disc and the pillar so that the disc will rotate with the index 16 an amount proportional to the temperature change. Since the cushioning disc 17 is located between the dial and the spiral strip 12, the strip cannot strike the dial when the instrument is jolted, consequently noise from this cause will be obviated.

What I claim is:

1. In an indicating instrument having a graduated dial, a pillar secured to said dial and projecting at right angles from the rear surface thereof, condition sensing means in the form of a spiral strip, said spiral strip having one end mounted on said pillar with the principal plane of said spiral strip parallel to said dial, the other end of said spiral strip being provided with an index in cooperative relation with the graduations on said dial and a cushioning disc mounted for frictional rotation on said pillar between said dial and said spiral strip and engaging said index for movement therewith.

2. In an indicating instrument, a dial with a graduated arcuate scale on one surface thereof and having an arcuate slot therein concentric with said scale, a pillar secured to the other surface of said dial at the center of curvature of said scale, condition sensing means in the form of a spiral strip, said spiral strip being mounted at one end on said pillar with the principal plane of said spiral strip parallel to said dial, the other end of said strip being provided with an index extension projecting through the slot in said dial, an index carried by said extension in a position to sweep over said scale, and a disc of cushioning material frictionally rotatable on said pillar and engaging said extension to move therewith.

3. In an indicating instrument, a support, a pillar secured thereto, a condition sensing element having one end fastened to said pillar in a position wherein said element might strike said support when jolted, with resulting noise, an index connected to the other end of said element, and means made of sound cushioning material and rotatable on said pillar with predetermined friction therebetween, said means being interposed between said element and said support and engaging said index for movement therewith whereby said noise is obviated and flutter of said index due to shock is reduced.

JULES A. WIDMER.